3,320,422
SOLID TRITIUM AND DEUTERIUM TARGETS
FOR NEUTRON GENERATOR
Edward A. St. John, Lindenhurst, N.Y., assignor to NRA, Inc., Long Island City, N.Y., a corporation of New York
No Drawing. Filed Oct. 4, 1963, Ser. No. 313,760
4 Claims. (Cl. 250—84.5)

This invention relates to hydrogen isotope target materials for neutron generators, and in particular to improved solid tritium and deuterium target materials for neutron generator use.

Recent work in the generation of fast neutrons by the use of hydrogen isotopes as target materials has indicated considerable utility of such neutron fluxes for measurement and other research. It has been found, however, that the neutron fluxes produced by accelerators utilizing this reaction are quite small when compared to those available from an atomic pile. While it is possible to generate positive ion beams of milliampere intensities, the beam currents utilized in neutron generators are normally restricted to the 100 microampere range.

If, for example, a target is composed of deuterated or tritiated water or ice or of compressed gas, the target must be isolated from the vacuum system of the accelerator by a window of sufficient thickness to withstand the pressure differential. Because of the energy loss involved in penetrating this thick window, the accelerating potentials employed must be several times the threshold energy of the reaction, and the beam current available is reduced, due to the limited power capabilities of most accelerating voltage sources.

Consequently, recent activity in the field of neutron generators has been in the direction of employing solid tritium and deuterium target materials. Such targets consist of tritium or deuterium sorbed in a thin layer of an active metal, which up to the present time has been invariably titanium or zirconium. These targets may be incorporated directly within the accelerator beam tube, and produce satisfactory neutron yields at convenient accelerating potentials. However, these materials have a serious drawback inherent in their poor thermal stability which requires that the beam current be restricted to prevent decomposition of the target. The restriction in beam current will of course limit the neutron yield.

Specifically, commercially produced solid target materials presently consist of an evaporated coating of titanium on a stainless steel backing into which the desired isotope is sorbed. These targets are not rated for operation under temperatures in excess of 250° C. because of the relatively high hydrogen vapor pressure of titanium hydrides at such temperatures regardless of the particular hydrogen isotope selected. In addition, the poor thermal stability of the hydride is aggravated by the poor thermal conductivity of the stainless steel employed as the backing. The beam currents in neutron generators utilizing these target materials are presently restricted to an upper limit of approximately 100 microamperes.

It is the object of the present invention to provide improved solid tritium and deuterium targets which will greatly increase the operating efficiency and productive capability of neutron generators, resulting in greater neutron flux yields. In addition to the improved neutron yield, the improved target should afford a greater range of utility for the generators, permitting their use, for example, in the remote measurement of subterranean densities and the like.

Another object of the invention is the provision of improved solid tritium and deuterium targets which, in addition to remaining stable at operating temperatures exceeding 500° C., result in a target life at least ten times that of the titanium tritide targets presently in use.

In accordance with the invention herein, solid tritium and deuterium targets for neutron generators are prepared from metallic elements having greater thermal stability than titanium or zirconium, presently in use when operated under similar conditions. The targets are prepared by reacting hydrogen isotopes in gaseous form with evaporated films of the metals on suitable substrates. The metals are generally selected from Group III-B and the lanthanum series on the Periodic Table, and are characterized by their formation of hydrides which are appreciably more stable than hydrides of titanium and zirconium at temperatures exceeding 300° C.

Vastly improved target performance and increased longevity are obtained by employing hydrides of the following metals as target materials:

Scandium and yttrium from the Group III-B series; lanthanum, cerium, praseodymium neodymium, terbium, erbium and dysprosium from the lanthanum group of rare earth elements.

In general the improved targets are formed by coating a suitable backing metal with one of the aforementioned elements in a vapor vacuum system, then introducing a hydrogen isotope in gaseous form into the vacuum chamber for a sufficient period to permit the isotope to be sorbed into the coating metal to produce a thin film of metallic hydride on the back metal.

The backing material, which may be copper, aluminum, stainless steel or other suitable metal is first etched so as to provide a good bonding surface for the evaporated metal. The backing piece is now loaded into the target and reaction chamber of the vapor vacuum system and this chamber is pumped down to a pressure of about $10^{-6}$ mm. of mercury. The filament is then loaded with the desired charge of metal and the loaded filament placed within the filament chamber of the vacuum system and pressure is established at $10^{-4}$ mm. of mercury. At this point, out-gassing is begun by use of a variable high-current A.C. source across the filament. The targets are simultaneously outgassed to about 500° F.

When both targets and filament have been thoroughly outgassed and the system pressure is below $10^{-5}$ mm. of mercury and preferably below $10^{-6}$ mm. of mercury, evaporation is begun.

The filament is now raised to a temperature sufficiently high to evaporate off the charge of metal, and the filament chamber placed in communication with the target and reaction chamber so that the backing material becomes coated with a film of the evaporant. Following evaporation, the valves are closed isolating the reaction chamber from the pumps and the filament chamber. The valves between the reaction chamber and tritium or deuterium gas source are now opened and the gas is sorbed into the target forming the tritide or deuteride with the film coating.

The thickness of the film coating may be varied depending upon the neutron yield desired of the target. The thicker the coating, the more gas is sorbed thereby and the greater the neutrons produced. This depends upon the amount of yield required by the particular use to which the target is to be put.

The metal tritides of the Group III-B elements have shown an increased half life approximately 2.25 times that of a standard titanium tritide target at comparable operating conditions. The metal tritides of he lanthanum series elements with only $\frac{1}{10}$ usual loading ratio have been found to yield an increased half-life 33% greater than the titanium tritides but it is believed that sufficient film thicknesses and heavier loading will increase this to ten to twelve times that of titanium tritide targets.

The thermal stability of the hydrides of the aforementioned elements from the Group III–B and lanthanum series exceeds that of either titanium or zirconium. The following table indicates the temperatures corresponding to a one micron vapor pressure of hydrogen in each of the selected hydrides as compared to the hydrides of titanium and zirconium.

| Material: | Temperature for hydrogen-metal at which the hydrogen vapor pressure equals one micron, °C. |
|---|---|
| $TiH_{1.1}$ | 307 |
| $ZrH_{1.1}$ | 437 |
| $ScH_{1.0}$ | 468 |
| $LaH_2$ | 522 |
| $NdH_2$ | 539 |
| $ErH_2$ | 575 |

The elements presently preferred commercially are scandium and erbium. These are highly metallic in character and appear to be chemically stable under ordinary ambient conditions. With scandium, the "stable" hydride temperature is 161° C., and 31° C. higher than those of titanium and zirconium respectively. The progressive increase of stability is considerable with respect to titanium but only slight with respect to zirconium. However, since the density of the scandium hydride is approximately 3.0 as compared to a density of 6.5 for zirconium hydride, beam absorption without neutron generation would be considerably reduced in the case of the scandium hydride.

Erbium hydride has a "stable" temperature 268° C. higher than titanium hydride and 138° C. higher than zirconium hydride. While the density of erbium hydride is relatively high (8.25), the hydrogen-metal ratio is twice that of the titanium and zirconium hydrides, producing a corresponding neutron yield which compensates for the increased beam absorption in a given thickness.

The target substrate may be made of the usual stainless steel, as well as copper or silver. In order to obtain optimum thermal capabilities of the target, it is preferred to employ copper or silver as the substrate.

While the improved targets described herein will produce both higher neutron yield and increased target life, where a greatly increased neutron flux is preferred over longer target life, the thermal stability of the targets may be utilized to permit an increased flux density of bombarding deuterons. A target loaded to one curie per square inch will yield approximately $6 \times 10^{10}$ neutrons per second and retain a twelve hour half-life when bombarded with a collimated 20 microampere beam (about 1 milliampere over the target area).

While preferred forms of the invention have been described herein, it will be obvious that omissions, changes and additions may be made, as well as substitutions of equivalent materials, without departing from the spirit and scope of the invention.

What is claimed is:

1. A neutron source target including a metallic base of high thermal conductivity, and a hydrogen isotope compound coating on said base, said hydrogen isotope compound comprising a tritide of scandium.

2. A neutron source target including a metallic base of high thermal conductivity, and a hydrogen isotope compound coating on said base, said hydrogen isotope compound comprising a deuteride of scandium.

3. A method of making neutron source targets comprising the steps of coating a metallic base of high thermal conductivity with a thin layer of scandium, and then introducing a hydrogen isotope in gaseous form into contact with said layer under sufficient heat and pressure conditions to permit the hydrogen isotope to be sorbed into said layer, said hydrogen isotope being selected from the class of tritium and deuterium.

4. A method of making neutron source targets comprising the steps of loading a metallic base of high thermal conductivity into the reaction chamber of a vacuum system, loading into the filament chamber of the vacuum system a charge of scandium, reducing the pressure in both reaction and filament chamber, heating the filament to evaporate the scandium charge, introducing the evaporated charge into the reaction chamber to provide a film coating of scandium on said base, isolating the reaction chamber from the rest of the vacuum system, and then introducing into the reaction chamber a hydrogen isotope gas selected from the class of tritium and deuterium, and permitting said gas to be sorbed into said film coating to form a hydride therewith.

References Cited by the Examiner

UNITED STATES PATENTS

| 2,967,245 | 1/1961 | Soloway | 250—84.5 |
| 3,124,711 | 3/1964 | Reifenschweiler | 313—61 |
| 3,167,655 | 1/1965 | Redstone | 250—84.5 |

REUBEN EPSTEIN, *Primary Examiner.*